United States Patent
Murata et al.

[19]

[11] Patent Number: 6,076,251

[45] Date of Patent: Jun. 20, 2000

[54] METHOD OF MANUFACTURING A FIELD COIL FOR MOTORS

[75] Inventors: Mitsuhiro Murata, Anjo; Masami Niimi, Handa, both of Japan

[73] Assignee: Nippondenso Co., Ltd., Kariya, Japan

[21] Appl. No.: 08/891,449

[22] Filed: Jul. 10, 1997

Related U.S. Application Data

[62] Division of application No. 08/436,481, filed as application No. PCT/JP94/01610, Sep. 28, 1994, abandoned.

[30] Foreign Application Priority Data

Sep. 29, 1993 [JP] Japan ................................. P5-242592
Dec. 24, 1993 [JP] Japan ................................. P5-328645

[51] Int. Cl.⁷ .................................................. H02K 15/00
[52] U.S. Cl. ............................................ 29/596; 310/180
[58] Field of Search ..................... 29/596, 597; 310/179, 310/180, 201, 208, 254, 67 R, 68 R; 72/340, 341

[56] References Cited

U.S. PATENT DOCUMENTS

| | | | |
|---|---|---|---|
| 2,961,747 | 11/1960 | Lyman . | |
| 4,431,932 | 2/1984 | Nathenson et al. | 310/208 |
| 4,677,332 | 6/1987 | Heyraud . | |
| 4,883,981 | 11/1989 | Gerfast . | |
| 4,962,329 | 10/1990 | Fujita et al. . | |
| 5,012,571 | 5/1991 | Fujita et al. | 29/598 |
| 5,099,162 | 3/1992 | Sawada | 310/198 |
| 5,210,452 | 5/1993 | Pratap et al. . | |
| 5,229,672 | 7/1993 | Iwaki | 310/51 |
| 5,260,620 | 11/1993 | Morrill | 310/185 |
| 5,497,041 | 3/1996 | Kondoh et al. | 310/156 |
| 5,874,881 | 2/1999 | Steinbusch | 335/222 |

FOREIGN PATENT DOCUMENTS

| | | |
|---|---|---|
| 0 522 475A1 | 7/1992 | European Pat. Off. . |
| 31 48 192A1 | 6/1983 | Germany . |
| 6 3549 | 4/1931 | Japan . |
| 58-139652 | 8/1983 | Japan . |
| 62-53146 | 3/1987 | Japan . |
| 3-127462 | 12/1991 | Japan . |
| 234278 | 5/1925 | United Kingdom . |
| WO 91/12619 | 8/1991 | WIPO . |

*Primary Examiner*—Carl E. Hall
*Assistant Examiner*—Davide Caputo
*Attorney, Agent, or Firm*—Pillsbury Madison & Sutro LLP

[57] ABSTRACT

A method of manufacturing a field coil for motors that does not require winding of a field coil on a pole core of a stator and that improves the space factor of the field coil. On a part of a conductor, an opening is formed to pass a pole core laid out in a stator therethrough and a spiral slit is formed to pass through the conductor in the thickness direction and connect the outer circumference of the conductor and the opening. An insulation material may be provided in the spiral slit when necessary.

16 Claims, 4 Drawing Sheets

METHOD OF MANUFACTURING A FIELD COIL FOR MOTORS

This is a division of application Ser. No. 08/436,481, filed on May 23, 1995, filed as application No. PCT/JP94/01610, Sep. 28, 1994 now abandoned.

TECHNICAL FIELD

This invention is related to a field coil for motors used, for instance, for starter motors.

BACKGROUND ART

Conventionally in the motor used for starters, the space factor of the field coil in the motor was increased as an effective method to downsize the motor.

In this case, a straight planar conductor covered with an insulation film having a sufficient insulation resistance has been used generally. If this straight planar conductor is applied to a field device having four magnetic poles as shown in FIG. 6, the straight planar conductor 20 is wound around a pole core 4 of a stator 3 as shown in FIG. 5, one end 20a of the straight planar conductor 20 is connected to the straight planar conductor wound on the neighboring magnetic pole via a connector bar 8, and the other end 20b is connected to a brush 5.

In the abovementioned conventional straight planar conductor 20, the straight planar conductor is wound on the pole core 4, so the insulation films on the surfaces of the straight planar conductors 20 contact creating a double layer insulation films. This causes the need to wind wire to form the field coil. Further, although the withstanding voltage between the straight planar conductors is lower than between the stator 3 and the straight planar conductor 20, the insulation films become excessive between the straight planar conductors. Thus, the problem of a decrease in the space factor of the field coil occurs.

This invention overcomes the above problems, and provides a field coil that can greatly increase the space factor without requiring winding on a pole core.

DISCLOSURE OF THE INVENTION

To solve the above problem, this invention uses a field coil characterized by an opening formed by the elimination of a part of a conductor. A pole core of a stator that provides a magnetic path, passes therethrough, and a spiral slit passes the conductor in the thickness direction and is formed around the periphery of the opening.

According to this invention, by arranging the opening formed by eliminating a part of the conductor and the spiral slit, the required field coil for winding is easily obtained, and the field coil need not be wound around the pole core. As the width of the slit can be set smaller, it need not be made excessively wide, and the space factor of the field coil can be improved greatly.

Further, the insulation material is provided in a part of the spiral slit or along the entire slit length. Therefore, even if the slit width is decreased to a minimum, the insulation material in the slit prevents short-circuiting between the coils and the space factor is improved further.

Still furthermore, provided that a plurality of field coils are formed integrally by forming the opening and the spiral slit in plural numbers for one conductor, the field coils for a plurality of magnetic poles can be formed at once. As a result, the space for the connector bar which connects the field coils is not required, and the space factor of the field coil can be improved by that amount. Furthermore, the number of required parts can be reduced.

BEST MODE FOR CARRYING OUT THE INVENTION

Figure 1:
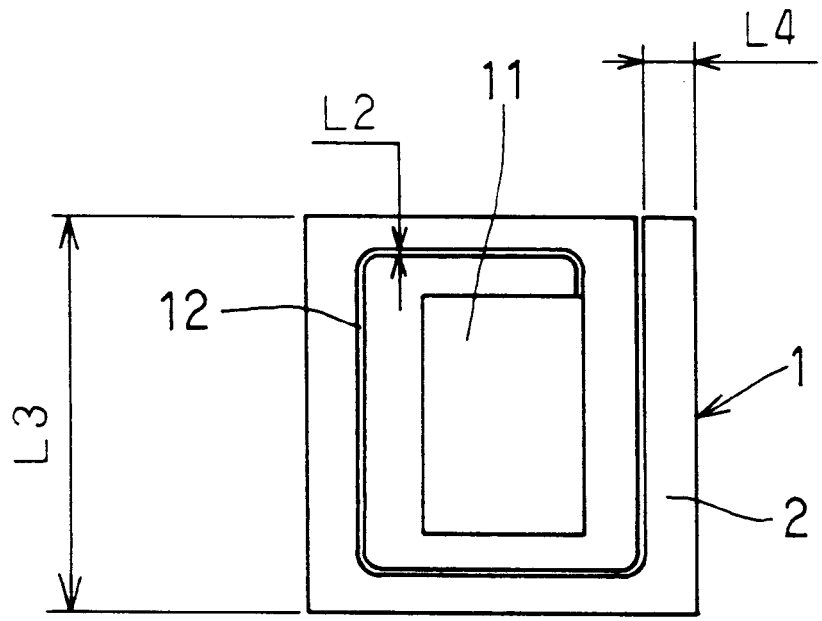
FIG. 1 is a top plan view of a field coil showing an embodiment of this invention.

This invention will be explained with reference to the embodiments shown in the drawings.

FIG. 1 shows a top view of the field coil 2 before being installed on a motor's stator. The field coil 2 is made of a conductor 1 (e.g., copper plate). In the center of this conductor 1 is a rectangular opening 11 through which a pole core that functions as a magnetic pole in the stator is passed through, although not shown in FIG. 1. Numeral 12 designates a spiral slit which is machined to cover the outer periphery of the opening 11 of the conductor 1 and which, passing through in the thickness direction, connects the outer circumference of the conductor 1 and the opening 11. Because the conductor 1 is divided by this slit 12, the field coil 2 is formed to have the line width L4. The slit 12 can be machined with mechanical machining, electrical discharge machining, laser beam machining or hydraulic pressure machining.

Figure 2:
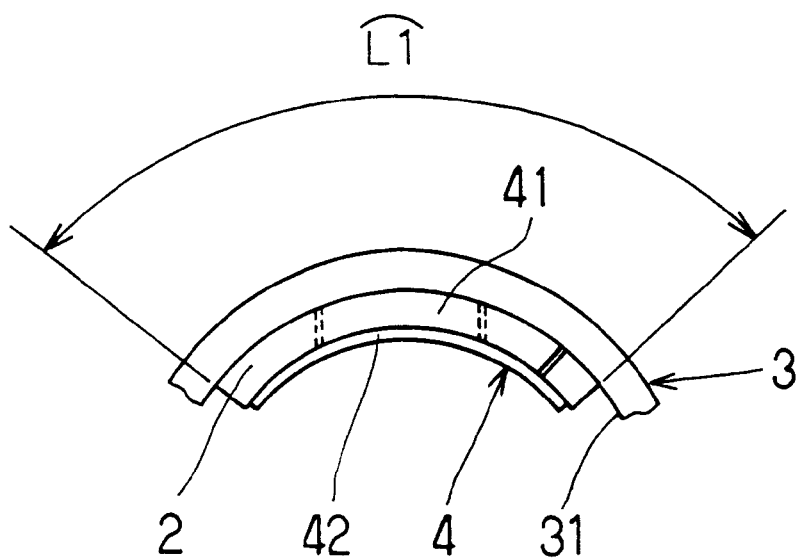
FIG. 2 is a side view showing the state with the coil in FIG. 1 mounted on a field device.

After machining the slit 12, as shown in FIG. 2, the field coil 2 is bent and formed along the arc shape of an inner circumferential surface 31 of the stator 3 that is a part of the field device, and then epoxy resin is applied to insulate the outer surface of the field coil 2. Then, the field coil 2 is placed on an inner surface 31 of the stator 3 and is engaged with a head 41 of the pole core 4. The base of the field coil 2 is sandwiched and fixed by a pole claw 42.

At this time, the width L2 of the slit 12 is so set that the field coil wires do not contact one another and short-circuit, after assembling the field coil 2 onto the stator 3. The arc length L1 of the field coil 2 is set so that the length is equivalent to one pole core length, and the horizontal length L3 is set to be in approximately the axial length of the armature core of the motor which is not shown.

As methods to insulate the field coil 2, insulation material to insulate the coil wires can be inserted into the slit 12 (e.g., insertion of insulation paper, or application or injection of resin), or the insulation material (e.g., powder) can be applied on the entire surface including the slit 12 of conductor 1, after the slit 12 is machined in the conductor 1. In this case, the width L2 of the slit 12 may be determined by the insulation material to be inserted into the slit.

With the above procedure, as the field coil 2 with the required number of windings can easily be obtained by machining and forming the slit 12 on the conductor 1 and the width L2 of the slit 12 in which the insulation material is laid can be arbitrarily set according to the withstanding voltage between the coil wires of the field coil, the insulation material will not become excessive and the space factor of the field coil 2 will be greatly improved. Furthermore, the wire width L4 of the field coil 2 can be arbitrarily set by the slit 12 so that the conductive current density does not become extremely high.

Figure 5:
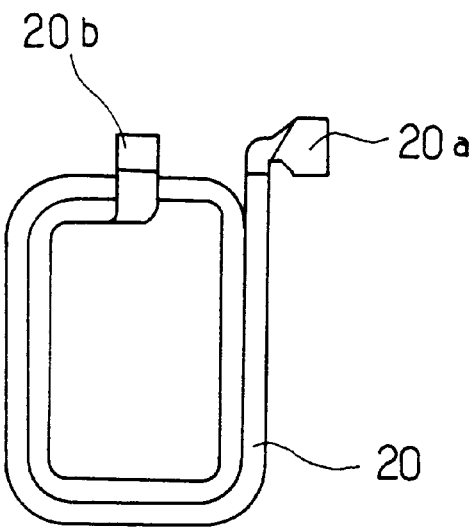
FIG. 5 is a top plan view of a conventional field coil.
Figure 6:
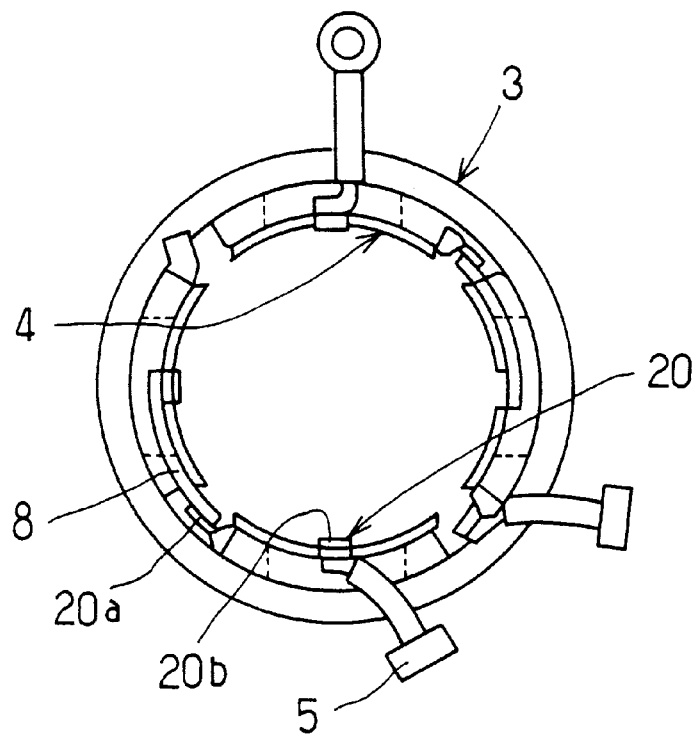
FIG. 6 is a side view showing the state with the conventional coil in FIG. 5 mounted on the field device.

Furthermore, in the conventional straight planar conductor 20 having the insulation film on the outer circumference as shown in FIGS. 5 and 6, the film may peel off and may cause a short-circuiting when wound on the pole core 4 of the stator 3. In this invention, however, the field coil 2 does not require winding, so the insulation material will not be separated during winding.

Figure 7:
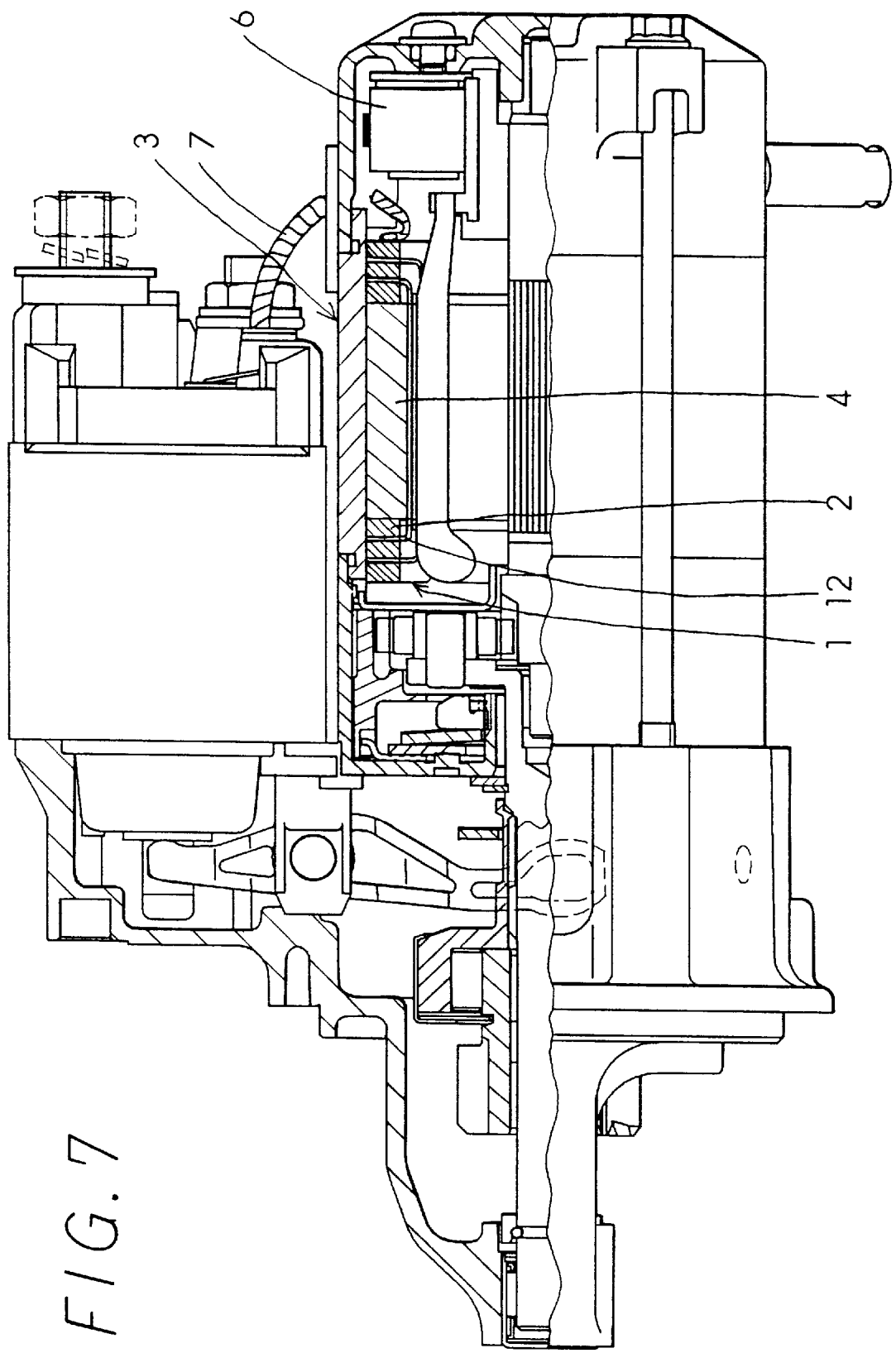
FIG. 7 is a side view partly in cross section of a speed reduction gear type starter incorporating the embodiment of this invention.

As is clear from the above explanation, by arranging the opening formed by eliminating the conductor and the spiral slit, the field coil with required winding can be obtained easily and the space factor of the field coil can be improved greatly. Thus, the effect in manufacturing and performance is remarkable for use in motors having relatively few windings and having a large conductor cross section area such as a motor for a starter requiring a large rated output in a short-time. To further downsize the starter, this invention provides a great effect in reducing the size of the motor by incorporating the speed reduction gear mechanism as shown in FIG. 7.

Figure 3:
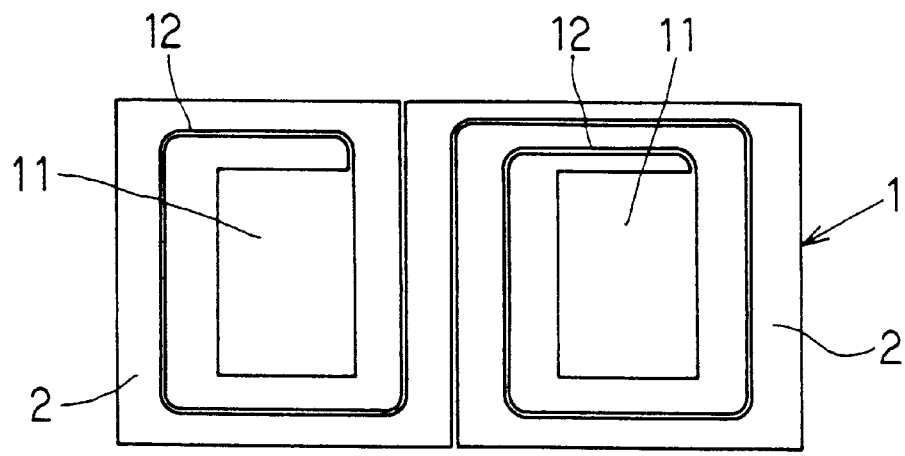
FIG. 3 is a top plan view of a field coil showing another embodiment of this invention.

Another embodiment of this invention will be explained next. FIG. 3 shows the field coil 2 for two magnetic poles formed with one conductor 1 and formed by arranging one set of slits 12.

Figure 4:
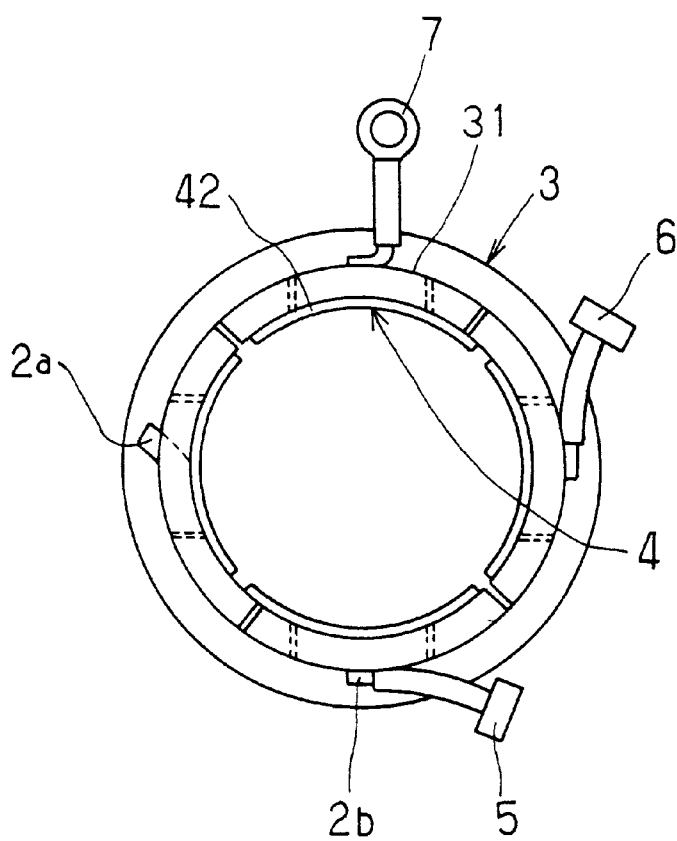
FIG. 4 is a side view showing the state with the coil in FIG. 3 mounted on the field device.

FIG. 4 shows the example of using the field coil 2 shown in FIG. 3 for the stator 3 of the field device having four magnetic poles. Two conductors 1 are laid out.

In other words, two conductors 1 are each laid out in the inner surface 31 of the stator 3, engaged with the head of the pole core 4 and fixed to the inner surface 31 by sandwiching the base of the conductor 1 with the pole claw 42. One end 2a of the two field coils 2 formed by one conductor is connected to the stator 3, and the other end 2b of the same is connected to a brush 5. One end of the two field coils 2 formed by the other conductor is connected to a lead wire 7, and the other end of the same is connected to the brush 6.

Therefore, by employing the structure shown in FIGS. 3 and 4, the field coil 2 for the two magnetic poles can be formed by one conductor 1 and the connector bar 8 connecting the field coils 2 as shown in FIG. 6 is no longer required. This allows space to be used effectively, and the space factor of the field coil 2 laid out in the stator 3 which forms a part of the field device can be improved further. Furthermore, the motors using this field coil 2 can be remarkably downsized.

In the above embodiments, although each piece of the conductor 1 is laid out in the inner surface direction of the stator 3, multiple pieces of conductor 1 car be overlaid in the inner surface direction of the stator 3.

Furthermore, in this invention, although field coil 2 is formed to follow the arc shape of the inner surface 31 of the stator 3 after slit machining, the slit machining can be performed after the formation. In this case, the slit width L2 can be made narrower and the space factor can be improved greatly.

INDUSTRIAL APPLICABILITY

As described above, the field coil for motors according to the present invention does not require winding the field coil around the magnetic pole and, in particular, can be used as the field device disposed in the starter.

We claim:

1. A method of producing a spiral field coil for a motor, said motor being provided with a cylindrical stator, a pole core having a head extending radially inwardly from said cylindrical stator, and a pole claw provided at a radially innermost end of said head and forming a space between said pole claw and an inner circumferential surface of said cylindrical stator, said method comprising:

shaping a conductive plate in an arcuate form in correspondence with a portion of said inner circumferential surface of said cylindrical stator; and forming a spiral slit through said conductive plate in a thickness direction to form a spiral field coil after said shaping.

2. A method according to claim 1, wherein:

said conductive plate has a thickness substantially equal to said space between said pole claw and said inner circumferential surface of said cylindrical stator.

3. A method according to claim 1, wherein forming includes:

forming an opening through said conductive plate in said thickness direction at a substantially central portion of said spiral slit, said opening being continuous with said spiral slit and surrounded by said spiral slit.

4. A method according to claim 3, wherein:

said conductive plate has a thickness substantially equal to said space between said pole claw and said inner circumferential surface of said cylindrical stator.

5. A method according to claim 3, wherein:

said forming of said opening forms two adjacent spiral field coils in said conductive plate.

6. A method according to claim 3, further comprising:

disposing said spiral field coil around said head radially inside said cylindrical stator, said head being received in said opening and said spiral field coil being sandwiched between said inner circumferential surface of said cylindrical stator and said pole claw.

7. A method according to claim 6, wherein:

said conductive plate has a thickness substantially equal to said space between said pole claw and said inner circumferential surface of said cyLindrical stator.

8. A method according to claim 7, further comprising:

filling said spiral slit with an insulating material after said forming of said spiral slit, after said forming of said opening, and before said disposing of said spiral field coil.

9. A method of producing a spiral field coil for a motor, said motor being provided with a cylindrical stator, a pole core having a head extending radially inwardly from said cylindrical stator and a pole claw provided at a radially innermost end of said head and forming a space between said pole claw and an inner circumferential surface of said cylindrical stator, said method comprising:

first, providing a single layer conductive plate;

second, shaping said single layer conductive plate in an arcuate form in correspondence with a portion of said inner circumferential surface of said cylindrical stator; and third, after said shaping, forming a spiral slit through said conductive plate in a thickness direction to form a spiral coil.

10. A method according to claim 9, wherein:

said conductive plate has a thickness substantially equal to said space between said pole claw and said inner circumferential surface of said cylindrical stator.

11. A method according to claim 9, wherein said forming includes:

forming an opening through said conductive plate in said thickness direction at a substantially central portion of said spiral slit, said opening being continuous with said spiral slit and surrounded by said spiral slit.

12. A method according to claim 11, wherein:

said conductive plate has a thickness substantially equal to said space between said pole claw and said inner circumferential surface of said cylindrical stator.

13. A method according to claim 11, wherein:

said forming of said spiral slit and said forming of said opening form two adjacent spiral field coils in said conductive plate.

14. A method according to claim 11, further comprising:

disposing said spiral field coil around said head radially inside said cylindrical stator, said head being received in said opening and said spiral field coil being sandwiched between said inner circumferential surface of said cylindrical stator and said pole claw.

15. A method according to claim 14, wherein:

said conductive plate has a thickness substantially equal to said space between said pole claw and said inner circumferential surface of said cylindrical stator.

16. A method according to claim 15, further comprising:

filling said spiral slit with an insulating material after said forming of said spiral slit, after said forming of said opening, and before said disposing of said spiral field coil.

* * * * *